United States Patent Office 3,321,430
Patented May 23, 1967

3,321,430
GRAFT POLYMERS AND A PROCESS FOR THE PRODUCTION OF AQUEOUS DISPERSIONS THEREOF
Karl-Heinz Ott and Karl Dinges, Cologne-Stammheim, and Karl-Heinrich Knapp, Leverkusen, Germany, assignors to Farbenfabriken Bayer Aktiengesellschaft, Leverkusen, Germany, a German corporation
No Drawing. Filed May 1, 1962, Ser. No. 191,437
Claims priority, application Germany, May 5, 1961, F 33,854
11 Claims. (Cl. 260—29.6)

This invention relates to novel copolymers. More specifically, the invention relates to a graft polymer of an ethylenically unstaurated polymer containing alkylene oxide groups and an olefinically unsaturated monomer. Furthermore, the invention is directed to a process of producing stable aqueous dispersions containing said graft polymer. These dispersions have the utility as dyeing and printing agents for textile materials.

It is known that graft polymers can be prepared from vinyl esters or acrylic acid esters, their derivatives or mixtures thereof with other monomers and polyalkylene oxides or polyalkylene glycols by dissolving the polyalkylene oxides or polyalkylene glycols and/or suitable derivatives thereof in vinyl esters or acrylic acid esters or mixtures thereof (with or without the addition of further solvents) and by polymerising these solutions in the usual manner with the addition of radical activators and/or by irradiation.

When using this process, however, good yields of graft polymers are only obtained if the graft polymerisation is effected in bulk form or at most in concentrated solution. This is unsatisfactory from a technical point of view for many purposes. For example, using the process set forth, only quite small graft polymerisation yields are obtained in aqueous emulsion. It is also known that organic compounds which contain an epoxide group and a carbon-carbon double bond can be copolymerised in the presence of ionically acting catalysts with saturated olefine oxides or with tetrahydrofuran. The following are mentioned as examples of saturated olefine oxides: ethylene oxide, propylene oxide, butylene oxide and substituted olefine oxides such as epichlorohydrin. As examples of organic compounds which contain an epoxide group and a carbon-carbon double bond, there are mentioned: methacrylic acid glycidyl ester allyl glycidyl ether, vinyl phenyl glycidyl ether and butadiene monoxide as well as many others.

The polyalkylene oxides thus obtained are substantially oily or waxy substances of linear structure, some of which are completely soluble in water and some in organic solvents. They still have carbon-carbon double bonds and consequently can be subsequently cross-linked by the action of heat or peroxides and other radical formers or can be copolymerised with other polymerisable monomers, such as styrene, acrylonitrile, acrylic or methacrylic acid esters, vinyl esters and others by conventional methods.

Aqueous dispersions of copolymers of the afore-mentioned type have, however, a number of disadvantages: for example, their stability is not equal to practical requirements. It has been found that a temporary drying out of these dispersions, especially under simultaneous mechanical stressing, results in the formation of coagulates. This disadvantage is shown in poor flow properties when producing coatings or impregnations from the said dispersions, and, for example, in clogging of stencils during a printing operation.

The present invention is directed to novel high molecular weight polymers and to a process of producing stable aqueous dispersions thereof, said polymers possess many useful properties including the utility of a cross-linking action. These copolymers are graft polymers of an ethylenically unsaturated polymer containing alkylene oxide groups resulting from copolymerisation of an alkylene oxide and an epoxide compound having a carbon-carbon double bond, said copolymer having a molecular weight above 400 and an olefinically unsaturated monomer having the general formula

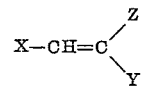

wherein X represents a member of the group consisting of hydrogen, chlorine, carboxylic acid group and carboxylic acid ester group, Y represents a member of the group consisting of hydrogen, chlorine, a lower alkyl, cyclohexyl and an aryl group and Z represents a member of the group consisting of hydrogen, chlorine, a lower alkyl group, the carboxylic acid group, the aldehyde group, the cyano group, a carboxylic acid ester group, a carboxylic acid amide group, the hydroxide group, an alkoxy group, an alkylamino group, an oxalkyl group, an alkylether group, an alkylarylether group, an ester group, an olefinic unsaturated hydrocarbon group, an olefinic unsaturated chlorohydrocarbon group, the phenyl group, the phenyl vinyl group, a chlorophenyl group, an alkylphenyl group, the cyclohexyl group, an arylsulfonate group, a carboxylic acid amide-N-alkylsulfonate group, a carboxylic acid amide-N-cyclohexyl sulfonate group and mixtures thereof, wherein said copolymer is present in an amount of from about 1 to 99 percent by weight based on the graft polymer.

It has been found that stable aqueous dispersions (and in accordance with a preferred form of the present invention, re-emulsifiable polymer dispersions of uncrosslinked graft polymers) can be obtained from polymerisable ethynenically unsaturated compounds (advantageously monomers with terminal vinyl groupings, but also conjugated diolefines and/or their mixtures with vinyl compounds as grafting components) and polyalkylene oxide or polyalkylene glycol derivatives containing carbon-carbon double bonds as grafting substrata. For this purpose, the polymerisable ethylenically unsaturated monomers or mixtures of such monomers with one another are polymerised using non-ionic emulsifiers, if required with additional use of up to a maximum of 0.5% of ionic emulsifiers (calculated on the total quantity of monomers) in the presence of one or more polyalkylene oxide or polyalkylene glycol derivatives, which still contain free carbon-carbon double bonds in the molecule the polymerisation taking place by means of radical activators in aqueous emulsion.

In detail, it has furthermore been found that in accordance with one special form of the present process, it is possible to obtain graft polymer dispersions with a base of polyalkylene oxides or polyalkylene glycols which are not only characterised by a very good capacity for re-emulsification, but in addition can be transformed after shaping into products with a high resistance to water by subsequent cross-linking.

Graft polymers of the last mentioned type can be obtained by using, as olefinically unsaturated polymerisable monomers, i.e. as grafting component, methylol ethers and/or Mannich bases of acrylamide or methacrylamide in quantities from 1 to 25%, calculated on the polyalkylene oxide or polyalkylene glycol used as grafting substratum.

Such products of particularly high water resistance can moreover be obtained by using as grafting components, polymerisable olefinically unsaturated monomeric compounds of the general Formula I in quantities of 1 to 25%, based on the total quantity of the grafting substratum:

$$ICH_2=CR-X-R_1$$

In this formula, R represents a hydrogen atom, an alkyl radical or a halogen atom, X is a divalent organic radical which carries a grouping activating the double bond of the monomer and $R_1$ a group capable of cross-linking. Compounds of this type are to be more fully explained below.

Polyalkylene oxide or polyalkylene glycol derivatives containing carbon-carbon double bonds and suitable as grafting substrata for the process of the present invention are obtained by copolymerisation of alkylene oxides, more especially ethylene oxide, with epoxide compounds containing carbon-carbon double bonds (such as methacrylic acid glycidyl ether, allyl glycidyl ether, vinyl phenyl glycidyl ether, butadiene monoxide and others) to form compounds with molecular weights from above 100 up to several millions, advantageously between 400 and 100,000. Instead of alkylene oxides or ethylene oxide, it is also possible to use the corresponding copolymers and terpolymers of ethylene oxide with propylene oxide, 1,2-epoxy butane, isobutylene oxide, tetrahydrofuran and compounds from the aromatic series, such as styrene oxide.

Considered as compounds suitable as grafting component for the process according to the invention, i.e. ethylenically unsaturated compounds, which can be grafted on to the aforesaid polyalkylene oxide or polyalkylene glycol derivatives, alone or in admixture with the compounds mentioned under the preferred form of this invention, are organic compounds which preferably carry terminal vinyl groupings, such as the following types:

(1) Esters of the acrylic and methacrylic acids with saturated monohydric or polyhydric aliphatic or cycloaliphatic alcohols having advantageously one to eight carbon atoms, such as methyl, ethyl propyl, and butyl acrylates and methacrylates, as well as monoesters, diesters and triesters of polyhydric alcohols, such as glycol monoacryl ester, glycol diacryl ester, glycerine diacryl ester and the like;

(2) Acrylic and methacrylic acid amides and also their derivatives;

(3) Acrylonitrile and methacrylonitrile;

(4) $\alpha,\beta$-Unsaturated monocarboxylic acids, such as acrylic and methacrylic acids and their halogen-substituted products, such as $\alpha$-halogenoacrylic acids;

(5) Vinyl ethers, such as vinylmethylether, vinylethylether and vinylpropylether;

(6) Esters of vinyl alcohol with organic acids, such as vinyl acetates, vinyl propionate and vinyl butyrate as well as vinylsulphonic acid;

(7) Aromatic or heterocyclic monovinyl or polyvinyl compounds, such as styrene, styrenes alkylated in the nucleus or on the side chain, styrenes halogenated on the nucleus or on the side chains, divinyl benzene, triallyl cyanurate and hexahydro-s-triacrylyl triazine;

(8) Compounds with two conjugated double bonds, more especially aliphatic conjugated diolefines with advantageously 4 to 6 carbon atoms, such as buta-1,3-diene, isoprene, dimethyl buta-2,3-diene, 2-chlorobuta-1,3-diene and others;

(9) Vinyl halides, such as vinyl chloride or vinylidene chloride;

(10) $\alpha,\beta$-Unsaturated aldehydes, such as acrolein or methacrolein.

However, it is also possible to use $\alpha,\beta$-unsaturated dicarboxylic acids, such as maleic or fumaric acids, or their functional derivatives and their esters, amides or semiesters.

In accordance with one particular form of the present invention, for the production of the reemulsifiable graft polymer dispersions of the type according to the invention, which in addition are capable of a subsequent crosslinking to water-insoluble products, olefinically unsaturated monomers of the groups mentioned below are used, at least in part, as grafting components:

(A) Methylol ethers of acrylic or methacrylic acid amides of the general Formula II $$CH_2=C-C-N-CH_2-OR_2$$
$$\quad\quad |\ \ ||\ \ |$$
$$\quad\quad R\ \ O\ \ R_1$$

in which R represents a hydrogen atom or a methyl group, $R_1$ hydrogen, alkyl, arylalkyl or aryl and $R_2$ alkyl or cycloalkyl, such as methyl, ethyl, n-propyl, isopropyl, n-butyl, isobutyl or cyclohexyl. Of particular interest in the present connection are the alkyl methylol ethers of methacrylic acid amide, more especially methyl-methylol ethers of methacrylamide and of the corresponding ethers of acrylamide.

(B) Mannich bases of acrylic and methacrylic acid amides in accordance with the following general Formula III $$CH_2=C-C-N-CH_2-N\begin{matrix}R_3\\R_4\end{matrix}$$
$$\quad\quad |\ \ ||\ \ |$$
$$\quad\quad R\ \ O\ \ R_1$$

in which R and $R_1$ have the same meaning as in Formula I (see below) and $R_3$ and $R_4$ stand for alkyl, cycloalkyl, aralkyl or jointly for a heterocyclic radical, such as the morpholine radical. Suitable compounds of this type are referred to in German patent specification (Patent Application F 27,046 IVb/39 b). The reaction products of methylol methacrylamide and dimethylaniline and also of methylol acrylamide and dimethylaniline are to be mentioned as examples.

(C) Vinyl monomers containing groups capable of cross-linking, as already mentioned above, which monomers correspond to the general Formula I:

$$CH_2=CR-X-R_1$$

In this formula:

R stands for a hydrogen atom, an alkyl radical, cycloalkyl radical, aryl radical or a halogen atom. $R_1$ stands for one of the following groupings:

$$-O-SO_3H,\ -CH_2-\underset{OH}{CH}-CH_2-Hal,\ -CH=CH-CH_2-Hal_2$$

$$-\underset{Z}{N}-(CH_2)_n-Hal$$

where Z is hydrogen or alkyl, and $$-N[(CH_2)_n-Hal]_2$$

wherein $n$ can be 2, 3 or 4; X stands for a divalent organic radical which, in the $\alpha$-position to the olefinic double bond in Formula I, contains a grouping activating the double bond, such as for example $$-CH_2-N\begin{matrix}Alkyl\\\ \end{matrix},\ -\underset{O}{\overset{\|}{C}}-,\ -O-$$

As preferred monomeric compounds for the production of the aforesaid graft polymers within the scope of the present invention, there are to be considered those which correspond to the classes of compounds represented by the following general formulae:

(1) Acrylamide derivatives containing sulphate groups and corresponding to Formula IV $$CH_2=CR-CO-N-(CH_2)_n-OSO_3H$$
$$\quad\quad\quad\quad\quad\quad\ \ |$$
$$\quad\quad\quad\quad\quad\quad\ \ R_2$$

wherein R represents hydrogen or methyl, $R_2$ hydrogen or an alkyl radical as well as a radical with the group $$-(CH_2)_n-O-SO_3H$$

and $n=2$, 3 or 4.

(2) Acrylamide derivatives containing halogenoalkyl groups and according to Formula V

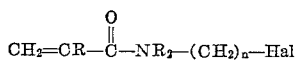

wherein R represents hydrogen or methyl, $R_2$ hydrogen or an alkyl radical as well as a radical with the grouping —$(CH_2)_n$—$OSO_3H$ and $n=2$, 3 or 4.

(3) Styrene sulphoamide derivatives according to the Formula VI

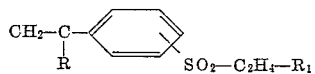

wherein R represents hydrogen or methyl and $R_1$ has the meaning indicated in Formula I.

(4) Styrene-sulphonic acid derivatives according to the Formula VII

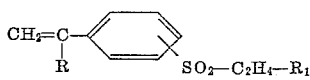

wherein R represents hydrogen or methyl and $R_1$ has the meaning given in Formula I.

Monomers of the aforementioned type serve for the production of the graft polymers according to the invention, by subjecting them, in conjunction with other co-polymerisable compounds containing olefinic double bonds, to graft polymerisation on to the said polyalkylene oxides or polyalkylene glycols, which still contain unsaturated C=C-double bonds. Suitable monomers which conform to the aforementioned general formulae are for example: acrylic acid-di-(β-chloroethyl)-amide, acrylic acid - (β - chloroethyl)-amide, acrylic acid-(β-sulphatoethyl)-amide, methacrylic acid - (β - sulphatoethyl)-amide, styrene - (β-sulphato-ethyl)-sulphamide, styrene-(β-chloroethyl)-sulphamide, chloroacetic acid allylamide, acrylic or methacrylic acid-β-chloroethylesters, N-allyl-N-methyl - N-β-sulphatoethylamine, N-allyl-N-methyl-N-β-chloroethylamine or substances of the Formula VIII

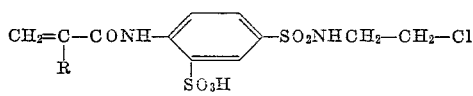

wherein R represents a hydrogen atom or a low alkyl radical, advantageously a methyl group.

In this connection, compounds of the vinyl sulphochloride type are finally to be mentioned as monomers which can serve for the production of graft polymers containing reactive groups. The polymerisable compounds containing ethylenically unsaturated carbon-carbon bonds, as mentioned as grafting components under 1 to 10, can be graft-copolymerised by themselves or in admixture with one another, but more especially in admixture with those monomers of the types A, B and C which are used according to the special form of this invention.

The quantities of the grafting components used for the present process can be such that the proportion of the grafting substratum which is used, i.e. of the polyether containing unsaturated carbon-carbon double bonds, is between 1 and 99% by weight and advantageously 10 to 90% by weight, calculated on the total quantity of the reaction components.

The monomers are selected according to the properties which are required of the graft polymers. Preferably, one or more monomers having an elasticising action are combined with one or more monomers having a strengthening action (i.e. acting to increase the hardness of the polymers) and a monomer causing a subsequent cross-linking and this mixture is subjected to graft polymerisation.

Designated as monomers with an elasticising action within the terms of the present invention are conjugated diolefines, esters of acrylic acid with more than two carbon atoms in the ester grouping and also esters of methacrylic acid with more than 4 carbon atoms in the ester grouping. The proportion of the monomer having an elasticising action should advantageously constitute 40 to 70% of the proportion of the total grafting component.

As monomers with a strengthening action within the scope of the present invention, there are to be understood styrene and substituted styrenes, on the one hand, and acrylonitrile or methacrylonitrile, on the other hand. The last-mentioned monomers are preferably introduced in a quantity corresponding to the difference between monomers with an elasticising action and monomers with a strengthening action.

Finally, as monomers with a cross-linking action, there are understood the aforementioned olefinically unsaturated methylol ethers and olefinically unsaturated Mannich bases, as well as the compounds of Formula I (which are mentioned under C). The latter are advantageously employed in quantities from 3 to 8%, calculated on the total quantity of the grafting components. Aqueous dispersions according to the present process are obtained by dissolving or emulsifying the polyalkylene oxide or polyalkylene glycol derivatives in water, depending on the nature thereof. It is advantageous to consider 10 to 40% solutions or dispersions. The indicated monomers are reacted in aqueous dispersion, using one or more non-ionic emulsifiers, possibly with the additional presence of a maximum of 0.5% (calculated on the total monomers) of an ionic emulsifier, with the aid of, for example, redox catalysts and/or irradiation, in the pH-range between 3 and 9.

The reaction temperature can in this case fluctuate within wide limits, i.e. between approximately +5° C. and the boiling point of the reaction medium in question. It has proved to be advantageous to carry out the graft polymerization at temperatures between 30 and 70° C., using redox catalysts, such as combinations of persulphates and pyrosulphates or bisulphites or triethanolamines in a pH-range between 3 and 9. Furthermore, it may be advantageous if the aqueous polymer dispersions which are obtained, after completing the graft polymerisation, if this has been carried out at a pH-value below 7, to be adjusted to a neutral or weakly alkaline pH-value, in order to produce unlimited storability of the dispersions. pH-values from 6.5 to 9 have proved especially suitable for this purpose. Redox systems are preferably considered for the present polymerisation process, especially those which contain alkali metal or ammonium persulphate, hydrogen peroxide, alkali metal or ammonium perborates percarbonates and perphosphates as component having an oxidising action. As reducing agents, there are considered both sulfur compounds of the low valency stages of sulfur, which act in acid medium, such as alkali metal or ammonium pyrosulphites, alkali metal or ammonium bisulphites or alkali metal thiosulphates.

Alkali metal formaldehyde sulphoxylates, formamidinesulphinic acid as well as reducing agents which are only active in alkali medium, such as triethanolamine, diethylene triamine or triethylene tetramine are also to be considered. It is obviously possible to use these redox systems in the presence of complex formers, such as pyrophosphates or those of the ethylene diamine tetraacetic acid type.

As emulsifiers of the non-ionic character, the known reaction products of ethylene oxide with long-chain fatty alcohols or with phenols are suitable, it being advantageous to employ reaction products with more than 10 ethylene oxide units. The following are mentioned as examples of non-ionic emulsifiers: reaction products of ethylene oxide (5 to 50 mols) with phenols (1 mol), for example, oxethylated nonyl phenols, oxethylated hydroxydiphenyl, reaction products of alkylene oxide with fatty alcohols, for example, oxethylated decyl alcohol, oxethylated oleyl alcohol and the like. These emulsifiers can be used in quantities of 1 to 10% by weight and preferably 2 to 6% by weight, based on the total weight of monomers.

For carrying out the present process, it is possible to use ion-active emulsifiers, more especially anion-active emulsifiers in addition to the said non-ionic emulsifiers, but the quantity of these ion-active emulsifiers should be at most 0.5%, based on the weight of the monomers introduced. The following are mentioned as examples of ion-active emulsifiers: long-chain alkyl sulphates, long-chain alkyl sulphonates or addition products of sulphuric acid with long-chain olefines.

As well as the aforementioned emulsifiers, it is possible to introduce conventional protective colloids, such as polyvinyl alcohol, polyvinyl pyrrolidone, polyacrylic acid salts, more especially the alkali or ammonium salts of polyacrylic acid, inorganic compounds, alkaline earth metal hydroxides, for example, magnesium hydroxide, finely divided barium sulphate or finely divided silica and substances having a similar action, advantageously in quantities from 1 to 10% by weight.

The dispersions obtained according to the present process are distinguished by particularly high stability, that is to say, they are proved to be stable (no coagulation) with respect to mechanical action, such as vigorous stirring, shaking or strong shearing forces. Furthermore, they have considerable resistivity to the action of frost.

The dispersions which can be produced according to the invention also show one particular form of high stability, that is to say, so-called reemulsifiability, and in fact to an increasing degree with, on the other hand, increasing contents of polyethylene oxide units in the graft substratum, and, on the other hand, with already relatively small contents of polymerised monomers with hydrophilic radicals, such as carboxyl, carbonamide, hydroxyl, and sulphonic acid groups, etc., in the grafting component. These reemulsifiable dispersions are not only subject to no coagulation, while drying under mechanical stressing, but also in the completely dried condition, after film-formation has been initiated, they can be stirred again or reemulsified with water to form a dispersion, even after several days. These properties, which are desirable for many purposes of use in the production of industrial products, can on the other hand often be undesirable for the final product, if, for example, a high resistance to water or an only slight swelling in water is required for these products.

In the case where grafting components as set out above under 1 to 10 are used, that is to say, those components which do not conform to the special form of using monomers with groupings which render possible a subsequent cross-linking, stable dispersions are obtained which are suitable for use in very many technical applications. By way of example, it is mentioned that such polymer dispersions can be stoved at relatively high temperatures, i.e. at temperatures above 150° C., on various supports which are suitable for this purpose and which have corresponding thermal resistivity.

On the other hand, graft polymer dispersions which have been prepared with the use of the monomers to be employed according to the special form of the process and permitting subsequent cross-linking, either have reactive methylol ether or tertiary aminomethylene groups or atom groupings, such as are set out in the afore-mentioned formulae. Consequently, they can be split at high temperature and/or under the action of acid or basic catalysts, a spontaneous cross-linking of the polymers being simultaneously caused, with formation of insoluble cross-linking products.

On account of their property of changing into insoluble cross-linked products, more especially under gentle conditions, the said polymers can be employed for the production of elements of any desired shape, such as coverings and adhesive coatings.

If monomers containing reactive methylol ether or tertiary aminoethylene groups are employed in accordance with the special from the invention, it is possible in this case to proceed in such a way that the dispersion is adjusted to an acid pH-value, advantageously 2 to 6, with suitable acids or acid reacting compounds, such as hydrochloric acid, sulphuric acid, phosphoric acid, acetic acid, trichloroacetic acid, ammonium chloride or acid phosphates, the dispersion then being brought on to suitable supports and the water being evaporated at high temperatures, whereupon cross-linking of the polymers takes place. It is however also possible to cause the cross-linking merely by the action of heat, and for this purpose temperatures from 80 to 250° C. and advantageously 100 to 200° C. have proved to be suitable.

If monomers containing atom groupings, such as set out in the afore-mentioned Formulae I or IV to VII, are employed in accordance with the special form of the invention, a cross-linking of the latices can again be effected solely by raising the temperature or even by simultaneous use of acid-combining agents. The temperatures in question are between 80 and 250° C., but advantageously between 100 and 180° C.

The following are mentioned as acid-combining agents: alkali metal hydroxides, carbonates and acetates as well as other alkali metal salts of weak acids, such s phosphtes and borates (buffering substances). The quantity of the acid-combining agents is to be such in this case that about 0.8 to 1.5 mols of acid acceptor are available for the quantity of acid generally to be split-off. However, quantities exceeding or below this value can be used in special cases. The aforementioned acid-combining agents are generally added to the latex prior to use. On the other hand, it is also possible, when using monomers containing the atom groupings which are set out in the Formulae I or IV to VIII, to cause a cross-linking of the latices by adding acid or compounds which liberate acid on being heated.

Although it is possible in principle for the reemulsifiable spontaneously cross-linking graft polymer emulsions which have been described to be used without any additional cross-linking agents for the production of moulded elements, it may nevertheless be advantageous in many cases for the dispersions to have added thereto additional cross-linking agents, such as water-soluble condensation products of aldehydes, more especially formaldehyde, with urea, melamine or alkyl methylol ether derivatives of such compounds, in order to cause an additional cross-linking of the moulded elements.

In the following examples, the parts indicated are parts by weight, unless otherwise mentioned.

EXAMPLE 1

A mixture of 40 parts of butyl acrylate, 21 parts of styrene and 6 parts of acrylamide is emulsified in a solution of 4 parts of a condensation product of 15 to 20 mols of ethylene oxide and 1 mol of o-hydroxydiphenyl-methane, 0.25 part of a formaldehyde-naphthalene-sulphonic acid condensation product, 33 parts of an ethylene oxide, allyl glycidyl ether copolymer (ethylene oxide: allyl glycidyl ether=95:5) with the molecular weight of about 60,000 and an intrinsic viscosity of 0.74 and 200 parts of water. After having removed the air from the reaction vessel by means of nitrogen, the mixture is heated to 45 to 50° C. and the polymerization is started by adding 0.8 part of triethanolamine and 0.4 part of potassium persulphate.

The duration of the graft polymerization is 24 hours and the polymer content is 33%. The dispersion which is obtained is adjusted with ammonia or triethanolamine to a pH-value of 7. The latex which is obtained shows an excellent mechanical stability. No coagulate is formed with dry rubbing and subsequent stirring with water.

*Comparison experiment*

If the four parts of the reaction product of 15 to 20 mols of ethylene oxide with 1 mol of o-hydroxydiphenyl methane referred to in the preceding example, are replaced by 4.5 parts of the sodium salt of a long-chain alkyl sulphonic acid or of an addition product of sulphuric acid with a long-chain olefine (ampho soap) while the remainder of the composition and the reaction conditions as set out in Example 1 are maintained, coagulation already appears during the reaction. Re-emulsification by means of water is not possible.

EXAMPLE 2

A mixture of 40 parts of acrylamide and 3 parts of the methyl methylol ether of methacrylamide is emulsified in a solution of 4 parts of a condensation product of 15 to 20 mols of ethylene oxide-allyl glycidyl ether copolymer with the molecular weight 60,000 and an intrinsic viscosity of 0.74 (ratio between ethylene oxide and allyl glycidyl ether=95:5) and 200 parts of water. After the air has been displaced from the reaction vessel by means of nitrogen, the mixture is heated to 45 to 50° C. and the polymerisation is started by adding 0.8 part of triethanolamine and 0.4 part of potassium persulphate.

The graft polymerisation is completed after 24 hours and the polymer content is 33.3%. The dispersion which is obtained is adjusted with ammonia or triethanolamine to a pH-value of 7. The latex obtained shows an excellent mechanical stability. No coagulant is formed on dry rubbing and subsequent stirring with water. The films produced from this latex can be quickly cross-linked at temperatures from about 100 to 120° C. upon adding acids or acid-yielding substances, such as ammonium nitrate or ammonium chloride.

EXAMPLE 3

A solution of 200 parts of water, 4 parts of a reaction product of 15 to 20 mols of ethylene oxide and 1 mol of o-hydroxydiphenyl methane and 33 parts of an ethylene oxide-allyl glycidyl ether copolymer of the molecular weight 30,000 and with an intrinsic viscosity of 0.53 (ethylene oxide:allyl glicidyl ether=80:10) is initially placed in a stirrer-type vessel 20 parts of ethyl acrylate, 20 parts of vinyl acetate, 31 parts of styrene, 3 parts of acrylamide and 3 parts of the methyl methylol ether of methacrylamide are now emulsified in this solution.

The air is displaced from the reaction vessel by nitrogen and a temperature of 45° C. is adjusted, and thereupon the polymerisation is started by adding 0.8 part of triethanolamine and 0.4 part of potassium persulphate.

The approximately 33% dispersion which is obtained is adjusted with ammonia or triethanolamine to a pH-value of 7. After the graft polymer has been subjected to dry rubbing, it can be again stirred with water without an irreversible coagulate being formed.

EXAMPLE 4

A solution of 4 parts of a reaction product of 15 to 20 mols of ethylene oxide and 1 mol of stearyl alcohol, 33 parts of an ethylene oxide-allyl glycidyl ether copolymer with a molecular weight of 50,000 and an intrinsic viscosity of 0.74 (ratio between ethylene oxide and allyl glycidyl ether=95:5) in 200 parts of water, is initially placed in a reaction vessel equipped with a stirrer mechanism and thermometer. 40 parts of butyl acrylate and 21 parts of acrylamide-N-methylol allyl ether are now emulsified in this solution. After displacing the air by nitrogen, the vessel is heated to 45 to 50° C. and the polymerisation is initiated by adding 0.8 part of triethanolamine and 0.4 part of potassium persulphate.

After 24 hours, the polymerisation reaction is completed, the yield of polymer being 98%. The dispersion is again brought to a pH-value of 7 by means of ammonia or triethanolamine. A few drops of the dispersion, after having been rubbed dry on the palm of the hand or on a glass sheet, can be stirred again with water and without formation of coagulate in the original dispersion.

EXAMPLE 5

A mixture of 57 parts of butyl acrylate, 5 parts of acrylamide and 5 parts of the butyl methylol ether of methacrylamide is emulsified into a solution of 5 parts of a condensation product of 15 to 20 mols of ethylene oxide and 1 mol of stearyl alcohol, 33 parts of an ethylene oxide-styrene oxide-allyl glycidyl ether copolymer (ethylene oxide:styrene oxide:allyl glycidyl ether=75:20:5) with the molecular weight 16,000 and an intrinsic viscosity of 0.34 and 200 parts of water. After the air has been displaced by introducing nitrogen, the polymerisation mixture is heated to 45° to 50° C. and the graft polymerisation is started by adding 0.8 part of triethanolamine and 0.4 g. of potassium persulphate.

After about 24 hours, the polymer content is 33%. The dispersion obtained is adjusted to a pH-value of 7 with ammonia or triethanolamine and shows a very good capacity for reemulsification.

EXAMPLE 6

A mixture of 40 parts of methyl methacrylate, 21 parts of styrene and 3 parts of methyl methylol ether of acrylamide is emulsified in a solution, such as already previously described several times, consisting of 5 parts of a condensation product of 15 to 20 mols of ethylene oxide and 1 mol of o-hydroxydiphenyl methane, 33 parts of an ethylene oxide-allyl glycidyl ether copolymer of the molecular weight 60,000 (ethylene oxide:allyl glycidyl ether=95:5) and 200 parts of water. After passing nitrogen therethrough and adding the activator system (0.8 part of sodium pyrosulphite amine and 0.4 part of ammonium persulphate), the graft polymerisation is carried out in the usual manner at a pH-value of 5. The approximately 32% dispersion which is obtained is again adjusted with ammonia or triethanolamine to a pH-value of 7 to 8.

EXAMPLE 7

A solution of 200 parts of water, 5 parts of a reaction product of 15 to 20 mols of ethylene oxide and 1 mol of o-hydroxydiphenyl methane and 0.25 part of a formaldehyde-naphthalene sulphonic acid condensation product, as well as 33 parts of a copolymer of ethylene oxide with styrene oxide and allyl glycidyl ether, with the molecular weight 40,000 and an intrinsic viscosity of 0.64 (ratio ethylene oxide:styrene oxide:allyl glycidyl ether=90:5:5) is initially placed in a stirrer-type vessel. In this solution, as already described in the preceding examples, a mixture of 40 parts of butyl acrylate, 21 parts of styrene, 3 parts of acrylamide and 3 parts of acrylic acid-(β-sulphatoethyl) amide is polymerised.

The latex which is obtained again shows an excellent mechanical stability. On rubbing dry and repeatedly stirring with water, no coagulate is formed.

EXAMPLE 8

Using the method already described in Example 1, a graft polymer is prepared from:

200 parts by weight of water
3 parts by weight of the emulsifier already repeatedly described
33 parts by weight of a copolymer of ethylene oxidepropylene oxide-allyl glycidyl ether of the molecular weight 14,500 and an intrinsic viscosity of 0.32 (ethylene oxide:propylene oxide:allyl glycidyl ether=75:20:5)
45 parts by weight of butyl acrylate
16 parts by weight of styrene
3 parts by weight of acrylamide
3 parts by weight of the methyl methylol ether of methacrylamide
0.8 part by weight of triethanolamine and,
0.4 part by weight of ammonium persulphate.

The dispersion, which is again obtained with a 100% yield, also shows the properties of complete reemulsifiability.

EXAMPLE 9

Using the method already described in Example 1, a graft polymer is prepared from:

268 parts by weight of water
8 parts by weight of the reaction product of 15–20 mols of ethylene oxide with 1 mol of o-hydroxydiphenyl methane
40 parts by weight of an ethylene oxide-allyl glycidyl ether copolymer of the molecular weight 60,000 and an intrinsic viscosity of 0.74
58 parts by weight of butyl acrylate
34 parts by weight of styrene
3 parts by weight of methacrylamide
3 parts by weight of Mannich base comprising one part of methacrylic acid amide, 1 part of formaldehyde and 1 part of dimethylamine
0.8 part by weight of triethanolamine
0.4 part by weight of ammonium persulphate.

EXAMPLE 10

Using the method already described in Example 1, a graft polymer is prepared from:

300 parts by weight of water
5 parts by weight of the reaction product of 15 to 20 mols of ethylene oxide with 1 mol of stearyl alcohol
33 parts by weight of an ethylene oxide-tetrahydrofuran copolymer of the molecular weight 31,000 and an intrinsic viscosity of 0.55 (ethylene oxide:tetrahydrofuran=90:10)
30 parts by weight of butyl acrylate
10 parts by weight of ethyl acrylate
21 parts by weight of styrene
3 parts by weight of methylmethylol ether of methacrylamide
0.8 part by weight of sodium pyrosulphite
0.4 part by weight of ammonium persulphate.

The dispersion which is obtained shows the same excellent capacity for reemulsification as has already been repeatedly described.

EXAMPLE 11

The experiment is arranged and carried out as already described in Examples 1 and 3. A graft polymer is prepared from:

200 parts by weight of water
5 parts by weight of the reaction product of 15 to 20 mols of ethylene oxide with 1 mol of stearyl alcohol
33 parts by weight of an ethylene oxide-ally glycidyl ether copolymer (ethylene oxide:allyl glycidy ether=95:5) of the molecular weight 60,000, an intrinsic viscosity of 0.74
25 parts by weight of ethyl acrylate
15 parts by weight of butyl acrylate
21 parts by weight of styrene
3 parts by weight of methacrylic acid-($\beta$-sulphatoethyl amide)
3 parts by weight of acryl amide
0.8 part by weight of triethanolamine
0.4 part by weight of ammonium persulphate.

The graft polymerisation is completed after 24 hours and the polymer content is 33%. The dispersion is adjusted to a pH-value of 7 with ammonia or triethanolamine. The latex which is obtained again shows an excellent mechanical stability and can be reemulsified in a very satisfactory manner.

EXAMPLE 12

Using the method already described in Example 1, a graft polymer is prepared from:

200 parts by weight of water
4 parts by weight of the reaction product of 15 to 20 mols of ethylene oxide with 1 mol of stearyl alcohol
50 parts by weight of an ethylene oxide-allyl glycidyl ether copolymer (ethylene oxide:allyl glycidyl ether=95:5) with the molecular weight 60,000 and an intrinsic viscosity of 0.74
22 parts by weight of methyl acrylate
22 parts by weight of styrene
3 parts by weight of methacrylamide
3 parts by weight of acrylic acid di-($\beta$-chloroethyl)-amide
0.6 part by weight of triethanolamine
0.3 part by weight of potassium persulphate.

The 33% dispersion which is obtained can be again stirred with water after having been rubbed dry, without an irreversible coagulate being formed.

EXAMPLE 13

Using the method already described in the preceding examples, a graft polymer is prepared from:

200 parts by weight of water
4 parts by weight of the reaction product of 20 mols of ethylene oxide with 1 mol of stearyl alcohol
35 parts by weight of a polyethylene oxide, into which 5% of allyl glycidyl ether are incorporated by polymerisation, having the molecular weight 60,000 and an intrinsic viscosity of 0.74
25 parts by weight of vinyl acetate
15 parts by weight of propyl methacrylate
19 parts by weight of styrene
3 parts by weight of allyl methylol ether of methacrylamide
3 parts by weight of acrylamide
0.8 part by weight of triethanolamine
0.4 part by weight of ammonium persulphate.

The latex dispersion which is obtained again shows the properties of having excellent capacity for reemulsification.

EXAMPLE 14

In a manner analogous to the working methods and reaction conditions already described in the preceding examples, a graft polymer is prepared from:

600 parts by weight of water
12 parts by weight of a condensation product of 15 to 20 mols of ethylene oxide with 1 mol of o-hydroxydiphenyl methane
40 parts by weight of acrylamide
50 parts by weight of propylene oxide-allyl glycidyl ether-tetrahydrofuran copolymer of the molecular weight 12,000 and with a ratio between propylene oxide, allyl glycidyl ether and tetrahydrofuran such as 85:5:10, dissolved in 120 parts of benzene
21 parts by weight of styrene
3 parts by weight of butyl methylol ether of acrylamide
3 parts by weight of acrylonitrile
0.8 part by weight of triethanolamine
0.5 part by weight of ammonium persulphate The latex which is obtained likewise shows an excellent mechanical stability. On being rubbed dry and subsequently stirred with water, no coagulate is formed.

EXAMPLE 15

A solution of 125 parts of the condensation product of 15 to 20 mols of ethylene oxide with 1 mol of o-hydroxydiphenyl methane, 250 parts of an ethylene oxide-allyl glycidyl ether copolymer of molecular weight 60,000 and an intrinsic viscosity of 0.74 (ethylene oxide:allyl glycidyl ether=95:5) and 3750 parts of water is initially placed in a stirrer-type autoclave with a capacity of 10 litres and provided with a stainless steel lining. A mixture of 1540 parts of butadiene, 900 parts of acrylonitrile, 12.5 parts of the methyl methylol ether of methacrylamide, 17.5 parts of dodecyl mercaptan, 75 parts of methacrylamide and 12.5 parts of divinyl benzene is emulsified in this solution. After the mixture has been heated to 25° C., 12 parts of sodium pyrosulphite, dissolved in 100 parts of water, and 12 parts of potassium persulphate, dissolved in 200 parts of water, are added. The polymerisation is completed after 30 hours. The substantially 38% latex is adjusted to a pH-value of 7 with ammonia or triethanolamine. After adding an age resistor, any unreacted monomer is removed by stirring out under reduced pressure.

The latex obtained shows an excellent mechanical stability.

EXAMPLE 16

Using the method already described in Example 1, a graft polymer is prepared from:

200 parts of water
4 parts by weight of the reaction product of 15 to 20 mols of ethylene oxide with 1 mol of stearyl alcohol
70 parts by weight of an ethylene oxide-allyl glycidyl ether copolymer of the molecular weight 60,000 and an intrinsic viscosity of 0.74 (ethylene oxide:allyl glycidyl ether=95:5)
12.5 parts by weight of butyl acrylate
12.5 parts by weight of styrene
2.5 parts by weight of acrylamide
2.5 parts by weight of methyl methylol ether of methacrylamide
0.8 part by weight of sodium persulphite
0.4 part by weight of potassium persulphate.

The dispersion obtained shows a mechanical stability and reemulsification behaviour such as described in Example 1.

EXAMPLE 17

Using the method already described in Example 1, a graft polymer is prepared from:

200 parts by weight of water
4 parts by weight of a reaction product of 15 to 20 mols of ethylene oxide with 1 mol of stearyl alcohol
5 parts by weight of an ethylene oxide-allyl glycidyl ether copolymer of molecular weight 60,000 and an intrinsic viscosity of 0.74
58 parts by weight of butyl acrylate
34 parts by weight of styrene
3 parts by weight of methyl methylol ether of methacrylamide
0.8 part by weight of triethanolamine
0.4 part by weight of ammonium persulphate The latex obtained again shows an excellent mechanical stability.

We claim:

1. A process for the preparation of a stable latex of a graft copolymer which comprises copolymerizing at least one olefinically unsaturated monomer with a copolymer of (a) an alkylene oxide from the group consisting of ethylene oxide, propylene oxide, and styrene oxide and (b) at least one epoxide compound containing carbon-to-carbon double bonds, which copolymer has a molecular weight of at least 400, the aforesaid polymerization being conducted in an aqueous dispersion at a temperature between 0–100 C. in the presence of non-ionic emulsifier and a radical-forming activator, said olefinically unsaturated monomer being selected from the group consisting of styrene, acrylonitrile, acrylamide, methacrylamide, an ester of acrylic acid with a saturated monohydric aliphatic alcohol having from 1–8 carbon atoms, an ester of methacrylic acid with a saturated monohydric aliphatic alcohol having from 1–8 carbon atoms, an ester of vinyl-alcohol with an organic acid, an aliphatic conjugated diolefine having from 4 to 6 carbon atoms, an aromatic polyvinyl compound, a N-methylolalkylether of acrylic acid amide, a N-methylolalkylether of methacrylic acid amide, a Mannich base of N-methylol acrylic acid amide and a Mannich base of N-methylol methacrylic acid amide, an acrylamide derivative containing sulfate groups and having the formula

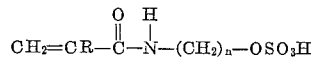

wherein R represents a member selected from the group consisting of hydrogen and methyl, and n represents a whole number from 2–4, and an acrylamide derivative of the formula

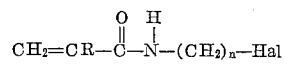

wherein R represents a member selected from the group consisting of hydrogen and methyl, Hal represents a halogen atom, and n stands for a whole number from 2–4; said latex being stable and re-emulsifiable.

2. The process of claim 1 wherein a mixture of a non-ionic emulsifier with not more than 0.5% by weight, based on the weight of the monomers, of an ionic emulsifier is employed.

3. The process of claim 1 wherein the said stable latex of the graft copolymer is characterized by the ability to form insoluble cross linked graft copolymers at elevated temperatures or by the action of an acidic or basic catalyst.

4. The process of claim 1 wherein said olefinically unsaturated monomer contains groups which are capable of cross linking after production of the graft copolymer.

5. The process of claim 1 wherein said alkylene oxide/epoxide copolymer is a copolymer of ethylene oxide and allyl glycidyl ether, and has a molecular weight of about 50,000 to 60,000.

6. The process of claim 1 wherein said alkylene oxide/epoxide copolymer is a copolymer of propylene oxide, allyl glycidyl ether, and tetrahydrofuran.

7. The process of claim 1 wherein said olefinically unsaturated monomer is composed of a mixture of styrene, acrylamide, and butyl acrylate.

8. The process of claim 1 wherein said olefinically unsaturated monomer is composed of a mixture of vinyl acetate, styrene, acrylamide and the methylol ether of methacrylic amide.

9. The process of claim 1 wherein said olefinically unsaturated monomer is composed of a mixture of butyl acrylate and acrylamide-N-methylol allyl ether.

10. The process of claim 1 wherein said olefinically unsaturated monomer is composed of a mixture of styrene, butyl acrylate, acrylamide and acrylic acid-(β-sulphatoethyl)-amide.

11. A stable graft copolymer latex prepared by the process of claim 1.

References Cited by the Examiner

UNITED STATES PATENTS 2,956,973  10/1960  Holdsworth _____ 260—29.6
3,030,326   4/1962  Goldberg et al. ____ 260—29.6
3,031,439   4/1962  Bailey _____ 260—29.6
3,033,841   5/1962  Germain _____ 260—29.6

SAMUEL H. BLECH, *Primary Examiner.*

WILLIAM H. SHORT, MURRAY TILLMAN,
*Examiners.*

J. NORRIS, J. ZIEGLER, *Assistant Examiners.*